United States Patent
Yoshimura et al.

(10) Patent No.: US 9,511,432 B2
(45) Date of Patent: Dec. 6, 2016

(54) GEAR MACHINING APPARATUS

(71) Applicant: MITSUBISHI HEAVY INDUSTRIES MACHINE TOOL CO., LTD., Ritto, Shiga (JP)

(72) Inventors: Hitoshi Yoshimura, Tokyo (JP); Hideaki Arisawa, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 0 days.

(21) Appl. No.: 14/764,676

(22) PCT Filed: Mar. 14, 2014

(86) PCT No.: PCT/JP2014/056921
§ 371 (c)(1),
(2) Date: Jul. 30, 2015

(87) PCT Pub. No.: WO2014/148390
PCT Pub. Date: Sep. 25, 2014

(65) Prior Publication Data
US 2015/0360308 A1 Dec. 17, 2015

(30) Foreign Application Priority Data
Mar. 22, 2013 (JP) ................. 2013-059648

(51) Int. Cl.
*B24B 53/00* (2006.01)
*B23F 23/12* (2006.01)
(Continued)

(52) U.S. Cl.
CPC ........... *B23F 23/1225* (2013.01); *B23F 1/023* (2013.01); *B23F 5/04* (2013.01); *B24B 53/075* (2013.01)

(58) Field of Classification Search
CPC ......... B23F 23/1235; B23F 1/023; B23F 5/04; B24B 53/075
(Continued)

(56) References Cited

U.S. PATENT DOCUMENTS 3,740,904 A * 6/1973 Ainoura ................ B23F 19/052
451/47
4,106,361 A 8/1978 Burtis
(Continued)

FOREIGN PATENT DOCUMENTS

JP 2010-125571 A 6/2010
JP 2012-206198 A 10/2012

OTHER PUBLICATIONS

International Search Report, issued in PCT/JP2014/056921, dated Apr. 15, 2014.
(Continued)

*Primary Examiner* — George Nguyen
(74) *Attorney, Agent, or Firm* — Birch, Stewart, Kolasch & Birch, LLP

(57) ABSTRACT

Provided are a gear machining apparatus and a gear machining method with which the surface roughness, in a tooth profile evaluation range, of the surfaces of the teeth of a gear can be improved. This gear machining apparatus (1) machines shapes a gear (4) by machining a workpiece (4) with a grinding wheel, and comprises: a threaded grinding wheel (32) that shapes a gear (4) by machining a workpiece (4); and a disc-shaped dresser (36) that shapes the threaded grinding wheel (32) while rotating with the threaded grinding wheel (32) in a meshed state. A pressure angle (a) of the dresser (36) is designed to be dislocated such that a reference pitch circle diameter (PCD) of the gear (4) shaped by the threaded grinding wheel (32) is outside the tooth profile evaluation range of a tooth surface (5).

4 Claims, 13 Drawing Sheets

(51) Int. Cl.
*B23F 5/04* (2006.01)
*B24B 53/075* (2006.01)
*B23F 1/02* (2006.01)

(58) Field of Classification Search
USPC .......................................................... 451/47
See application file for complete search history.

(56) References Cited

U.S. PATENT DOCUMENTS

| | | | | |
|---|---|---|---|---|
| 4,414,955 A * | 11/1983 | Bunge | ................... | B24B 53/075 125/11.1 |
| 4,850,155 A * | 7/1989 | Sulzer | ....................... | B23F 5/04 451/148 |
| 5,573,449 A * | 11/1996 | Mackowsky | ............. | B23F 5/04 451/219 |
| 5,580,298 A * | 12/1996 | Stadtfeld | .................. | B23F 9/00 451/1 |
| 5,857,894 A * | 1/1999 | Griesbach | ................. | B23F 5/04 409/183 |
| 6,217,409 B1 * | 4/2001 | Stadtfeld | .................. | B23F 5/04 451/147 |
| 7,341,501 B2 * | 3/2008 | Yanase | ................ | B23F 23/1225 451/10 |
| 8,460,064 B2 * | 6/2013 | Yanase | ................ | B23F 23/1225 451/443 |
| 8,506,358 B2 * | 8/2013 | Amarell | .................. | B23F 23/04 409/9 |
| 8,882,564 B2 * | 11/2014 | Kobialka | ................ | B24B 53/06 451/10 |
| 2012/0129434 A1 * | 5/2012 | Hackman | ................ | B24B 3/022 451/48 |
| 2013/0039712 A1 * | 2/2013 | Stadtfeld | ................ | B23F 9/025 409/2 |

OTHER PUBLICATIONS

Notice of Allowance, issued in JP 2013-059648, dispatched on Apr. 9, 2014.
Written Opinion of the International Searching Authority, issued in PCT/JP2014/056921, dated Apr. 15, 2014.
English Translation of the Written Opinion of the International Searching Authority, issued in PCT/JP2014/056921, dated Apr. 15, 2014.

* cited by examiner

GEAR MACHINING APPARATUS

TECHNICAL FIELD

The present invention relates to a gear machining apparatus that shapes a gear by machining a workpiece with a grinding wheel, and a gear machining method for the same.

BACKGROUND ART

As described in Patent Document 1, an apparatus is conventionally known that shapes a gear by causing a hob to rotate at a high speed and then by gear cutting a workpiece with cutting teeth of the hob.

Furthermore, as a gear machining apparatus that shapes a gear by grinding a workpiece with a grinding wheel, an apparatus is known that shapes a gear by dressing a threaded grinding wheel with a dresser having a shape corresponding to a shape of the gear to be machined and then by causing the threaded grinding wheel to grind the workpiece into a shape corresponding to the shape of the dresser.

CITATION LIST

Patent Literature

Patent Document 1: Japanese Unexamined Patent Application Publication No. 2010-125571A

SUMMARY OF INVENTION

Technical Problem

However, in the above-described conventional gear machining apparatus, when the threaded grinding wheel grinds the workpiece while rotating with the workpiece in a meshed state, the threaded grinding wheel grinds the workpiece in a tooth trace direction of a tooth surface of the gear. Thus, the surface uniformity in the tooth trace direction of the tooth surface of the gear can be ground favorably.

With regard to such a gear machining apparatus, the present inventors have conducted diligent research to improve the accuracy of grinding the tooth surface of the gear. In the course of the research, the present inventors have identified a problem in which, when the gear is shaped by machining the workpiece with the threaded grinding wheel, a tooth surface slip rate, at which the threaded grinding wheel moves with respect to the workpiece in a tooth profile direction, becomes zero at a reference pitch circle diameter at the time of grinding, and as a result, the surface uniformity in a tooth profile evaluation range of the tooth surface of the gear is decreased.

In light of the foregoing, an object of the present invention is to provide a gear machining apparatus and a gear machining method with which the surface uniformity in a tooth profile evaluation range of a tooth surface of a gear can be improved.

Solution to Problem

To solve the abovementioned object, an embodiment of the present invention is a gear machining apparatus configured to shape a gear by machining a workpiece with a grinding wheel. The gear machining apparatus comprises a threaded grinding wheel configured to shape a gear by machining a workpiece and a disc-shaped dresser configured to shape the threaded grinding wheel while rotating with the threaded grinding wheel in a meshed state. A pressure angle of the dresser is designed to be shifted (dislocated) so that a position, at which relative movement in a tooth profile direction of the gear does not occur between a surface of the threaded grinding wheel and a gear to be machined, is positioned outside of a tooth profile evaluation range, when the shaped threaded grinding wheel shapes the gear. The tooth profile evaluation range is set as a section of a tooth surface of the machined gear that functions as a tooth surface of the gear when the gear is used.

In the present invention configured in this manner, the dresser shapes the threaded grinding wheel, and the threaded grinding wheel shapes the gear by machining the workpiece. When the shaped threaded grinding wheel shapes the gear, the pressure angle of the dresser is designed to be shifted so that the position, at which relative movement in the tooth profile direction of the gear does not occur between the surface of the threaded grinding wheel and the gear to be machined, is positioned outside of the tooth profile evaluation range. As a result, within the tooth profile evaluation range of the tooth surface of the machined gear, the position does not exist at which relative movement in the tooth profile direction of the gear does not occur between the surface of the threaded grinding wheel and the gear to be machined. Thus, a tooth surface slip rate, at which the threaded grinding wheel moves with respect to the workpiece in the tooth profile direction of the workpiece, does not become zero, and it is possible to improve the surface uniformity in the tooth profile evaluation range of the tooth surface of the gear.

In the present invention, preferably, the dresser is designed to be shifted so that the pressure angle thereof is decreased, and the position at which relative movement does not occur is moved to an inner side of the tooth profile evaluation range.

In the present invention configured in this manner, the dresser is designed to be shifted so that the pressure angle thereof is decreased, and the position, at which relative movement in the tooth profile direction of the gear does not occur between the surface of the threaded grinding wheel and the gear to be machined, is moved to the inner side of the tooth profile evaluation range of the tooth surface. Thus, the position at which relative movement does not occur does not exist within the tooth profile evaluation range of the tooth surface of the gear. As a result, a value of the tooth surface slip rate, at which the threaded grinding wheel moves with respect to the workpiece in the tooth profile direction of the workpiece, does not become zero, and it is possible to improve the surface uniformity in the tooth profile evaluation range of the tooth surface of the gear.

In the present invention, preferably, the dresser is designed to be shifted so that the pressure angle thereof is increased, and the position at which relative movement does not occur is moved to an outer side of the tooth profile evaluation range of the tooth surface.

In the present invention configured in this manner, the dresser is designed to be shifted so that the pressure angle thereof is increased, and the position, at which relative movement in the tooth profile direction of the gear does not occur between the surface of the threaded grinding wheel and the gear to be machined, is moved to the outer side of the tooth profile evaluation range of the tooth surface. Thus, the position at which relative movement does not occur does not exist within the tooth profile evaluation range of the tooth surface of the gear. As a result, the value of the tooth surface slip rate, at which the threaded grinding wheel moves with respect to the workpiece in the tooth profile direction of the workpiece, does not become zero, and it is possible to improve the surface uniformity in the tooth profile evaluation range of the tooth surface of the gear.

In the present invention, preferably, a gear machining method for shaping a gear by machining a workpiece with a grinding wheel includes the steps of preparing a threaded grinding wheel configured to shape a gear by machining a workpiece and a disc-shaped dresser configured to shape the threaded grinding wheel while rotating with the threaded grinding wheel in a meshed state, wherein a pressure angle of the dresser is designed to be shifted so that a position, at which relative movement in a tooth profile direction of the gear does not occur between a surface of the threaded grinding wheel and a gear to be machined, is positioned outside of a tooth profile evaluation range, when the shaped threaded grinding wheel shapes the gear; shaping the threaded grinding wheel with the dresser; and shaping the gear by machining the workpiece with the threaded grinding wheel, wherein the tooth profile evaluation range is set as a section of a tooth surface of the machined gear that functions as a tooth surface of the gear when the gear is used.

In the present invention configured in this manner, the dresser shapes the threaded grinding wheel, and the threaded grinding wheel shapes the gear by machining the workpiece. When the shaped threaded grinding wheel shapes the gear, the pressure angle of the dresser is designed to be shifted so that the position, at which relative movement in the tooth profile direction of the gear does not occur between the surface of the threaded grinding wheel and the gear to be machined, is outside of the tooth profile evaluation range of the tooth surface. As a result, within the tooth profile evaluation range of the tooth surface of the machined gear, the position does not exist at which relative movement in the tooth profile direction of the gear does not occur between the surface of the threaded grinding wheel and the gear to be machined. Thus, a tooth surface slip rate, at which the threaded grinding wheel moves with respect to the workpiece in the tooth profile direction of the workpiece, does not become zero, and it is possible to improve surface uniformity in the tooth profile evaluation range of the tooth surface of the gear.

Advantageous Effects of Invention

According to a gear machining apparatus and a gear machining method of the present invention, it is possible to improve the surface uniformity in a tooth profile evaluation range of a tooth surface of a gear.

BRIEF DESCRIPTION OF DRAWINGS

FIG. 1A is a plan view schematically illustrating tooth surface slip that occurs when a conventional threaded grinding wheel moves with respect to a workpiece in a tooth profile direction of a gear, wherein FIG. 1A illustrates a state before a reference pitch circle diameter portion of the gear of the workpiece and a reference pitch circle diameter corresponding portion of the threaded grinding wheel come into contact with each other in a relationship at the time of grinding.

FIG. 1B is a plan view schematically illustrating tooth surface slip, in which the conventional threaded grinding wheel moves with respect to the workpiece in the tooth profile direction of the gear, wherein FIG. 1B illustrates a state in which the abovementioned portions are in contact with each other.

FIG. 1C is a plan view schematically illustrating tooth surface slip, in which the conventional threaded grinding wheel moves with respect to the workpiece in the tooth profile direction of the gear, wherein FIG. 1C illustrates a state after the abovementioned portions have come into contact with each other.

DESCRIPTION OF EMBODIMENTS

As described above, the present inventors, et al. have identified a problem in which, when a gear is shaped by machining a workpiece with a threaded grinding wheel, a tooth surface slip rate, at which the threaded grinding wheel moves with respect to the workpiece in a tooth profile direction, becomes zero, and as a result, the surface uniformity in a tooth profile evaluation range of a tooth surface of the gear deteriorates. This problem will be described with reference to FIGS. 1A, 1B, and 1C.

As illustrated in FIGS. 1A, 1B, 1C and FIG. 2, when a threaded grinding wheel 100 grinds a workpiece 102, a tooth surface slip phenomenon (tooth surface slip) occurs in which the threaded grinding wheel 100 moves with respect to the workpiece 102 in a tooth profile direction A of a tooth surface 102$f$ while slipping.

Figure 1A:
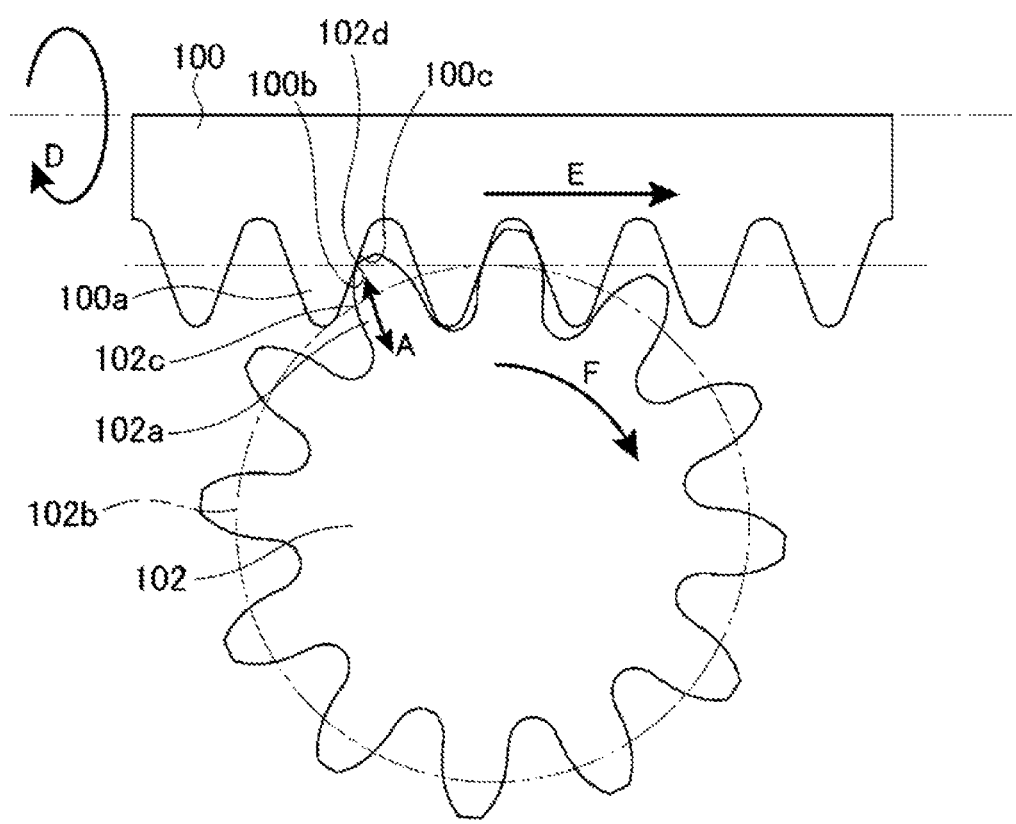
Figure 1B:
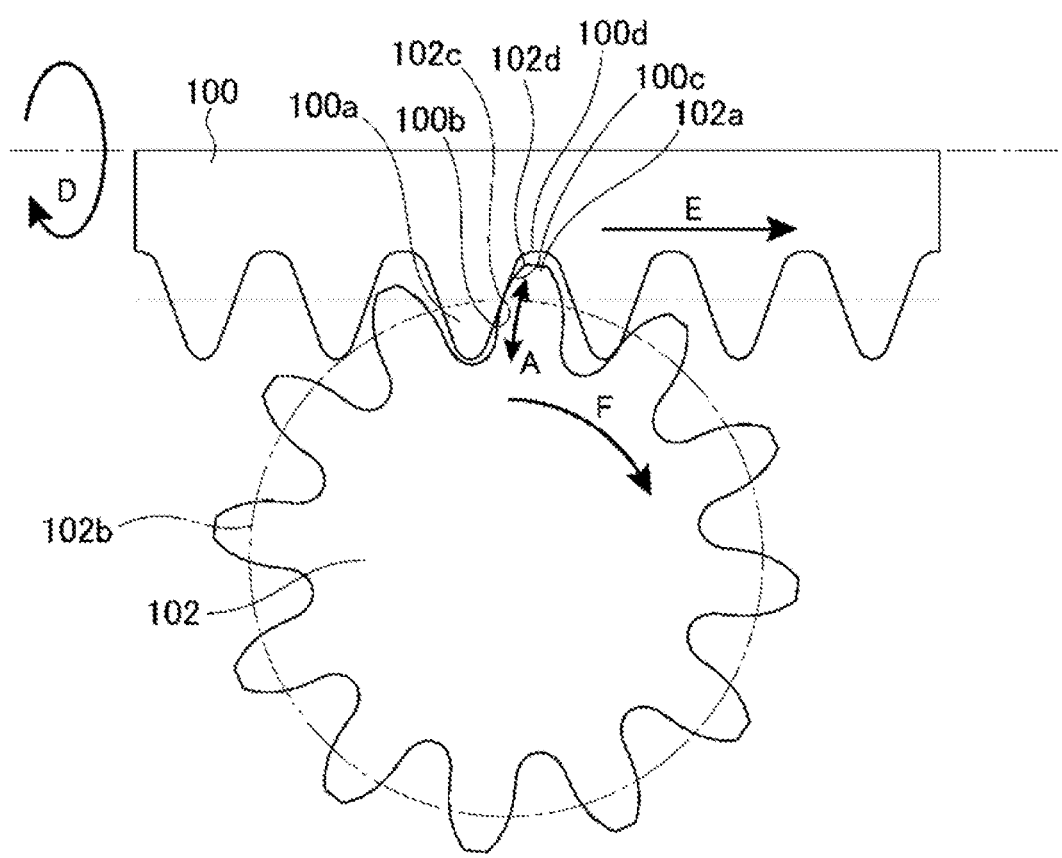
Figure 1C:
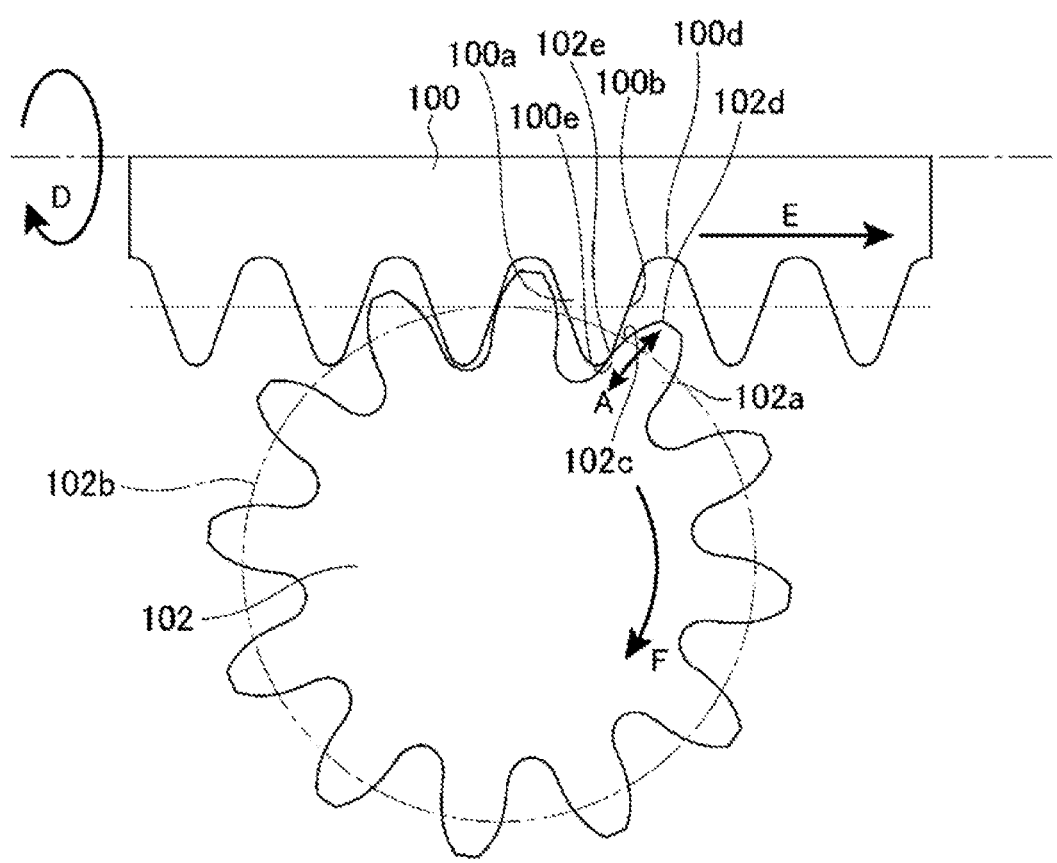
Figure 2:
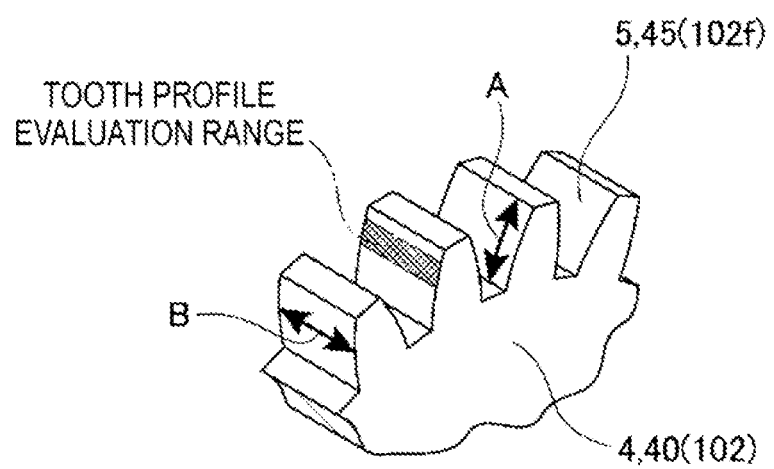
FIG. 2 is a diagram illustrating a tooth profile direction, a tooth trace direction, and a tooth profile evaluation range on a tooth surface of the gear.

FIG. 1A illustrates a state before a reference pitch circle diameter portion of a gear of a workpiece and a reference pitch circle diameter corresponding portion of the threaded grinding wheel come into contact with each other in a conventional grinding process. FIG. 1B illustrates a state in which the reference pitch circle diameter portion and the reference pitch circle diameter corresponding portion are in contact with each other, and FIG. 1C illustrates a state after both the reference pitch circle diameter portion and the reference pitch circle diameter corresponding portion have come into contact with each other. FIG. 2 is a diagram illustrating a tooth profile direction, a tooth trace direction, and a tooth profile evaluation range on a tooth surface of the gear.

Here, as illustrated in FIG. 2, the tooth profile direction A of the workpiece (gear) indicates a direction from a tooth tip of a tooth of the workpiece (gear) toward a root of the tooth (or a direction from the root of the tooth toward the tooth tip), and a tooth trace direction B indicates a direction in which a tooth trace of the tooth of the workpiece (gear) extends. Furthermore, in FIG. 1, a reference pitch circle diameter PCD is illustrated by a virtual line. Note that the tooth profile direction A, the tooth trace direction B, and the tooth profile evaluation range on the tooth surface of the gear are illustrated in FIG. 2, and the tooth profile direction A, the tooth trace direction B, and the tooth profile evaluation range on the tooth surface of the gear illustrated in FIG. 2 are also referred to with similar meanings in an explanation of the present invention given below.

As illustrated in FIG. 1A, the threaded grinding wheel 100, which has a thread ridge formed in a helical pattern on an outer peripheral surface thereof, is rotated about a central rotation axis in a direction of an arrow D, and a thread ridge 100a on the outer peripheral surface of the threaded grinding wheel 100 moves in a direction of an arrow E.

With the threaded grinding wheel 100 and the workpiece 102 in a meshed state, when the thread ridge 100a of the threaded grinding wheel 100 moves in the direction of the arrow E, the workpiece 102 is rotated about the rotation axis in a direction of an arrow F. At this time, as the thread ridge 100a of the threaded grinding wheel 100 and an external tooth 102a of the workpiece 102 are moving relatively to each other so that a part of the thread ridge 100a comes into contact with a part of the external tooth 102a, the thread ridge 100a of the threaded grinding wheel 100 grinds the external tooth 102a of the workpiece 102 in the tooth profile direction A.

In FIG. 1A, the reference pitch circle diameter PCD of the gear 102 is illustrated by a reference pitch circle diameter 102b, and a point on the reference pitch circle diameter PCD on the surface of the external tooth 102a of the workpiece 102 is illustrated by a reference pitch circle diameter portion 102c. Furthermore, in the threaded grinding wheel 100, a section on the surface of the thread ridge 100a of the threaded grinding wheel 100 which corresponds to the reference pitch circle diameter PCD of the gear 102, is illustrated by a reference pitch circle diameter corresponding portion 100b.

As illustrated in FIG. 1A, the reference pitch circle diameter portion 102c is positioned so as to be separated from the reference pitch circle diameter corresponding portion 100b, and an external tooth surface tooth tip portion 102d and a thread ridge surface tooth root portion 100c are in a state of being in contact with each other. After that, as the thread ridge 100a moves in the direction of the arrow E and the workpiece 102 rotates in the direction of the arrow F, grinding is performed while a section that extends from the thread ridge surface tooth root portion 100c further to the tooth root side than the reference pitch circle diameter corresponding portion 100b sequentially makes contact with a section that extends from the external tooth surface tooth tip portion 102d further to the tooth tip side than the reference pitch circle diameter portion 102c, so as to perform tooth surface slip (so as to move in the tooth profile direction A while slipping).

Thus, a value of a rate at which tooth surface slip of the workpiece 102 is performed by the section that extends from the thread ridge surface tooth root portion 100c of the threaded grinding wheel 100 to the reference pitch circle diameter corresponding portion 100b, with respect to the section that extends from the external tooth surface tooth tip portion 102d of the workpiece 102 further to the tooth tip side than the reference pitch circle diameter portion 102c, (a rate of movement in the tooth profile direction A) becomes greater than zero. In this way, as the tooth surface slip rate has a value greater than zero, the threaded grinding wheel grinds, slipping in the tooth profile direction A of the workpiece 102, and thereby, the surface uniformity of the tooth surface 102f of the machined gear 102 becomes favorable.

Next, as illustrated in FIG. 1B, the thread ridge 100a moves in the direction of the arrow E, and the workpiece 102 rotates in the direction of the arrow F. As a result, the external tooth surface tooth tip portion 102d of the external tooth 102a of the workpiece 102 moves relatively in a direction toward a tooth bottom 100d, which is formed between the thread ridges 100a of the threaded grinding wheel 100, and the reference pitch circle diameter corresponding portion 100b and the reference pitch circle diameter portion 102c come into contact with each other so as to be aligned with each other. Specifically, the reference pitch circle diameter corresponding portion 100b and the reference pitch circle diameter portion 102c match up with each other without performing tooth surface slip (movement in the tooth profile direction A) with respect to the workpiece 102. Thus, the rate at which tooth surface slip is performed by the threaded grinding wheel 100 with respect to the workpiece 102 (the rate of movement in the tooth profile direction A) becomes zero.

In this state, at the reference pitch circle diameter portion 102c, in the relationship at the time of grinding between the threaded grinding wheel 100 and the gear 102, the threaded grinding wheel 100 does not move with respect to the workpiece 102 in the tooth profile direction A of the workpiece 102. Thus, at the reference pitch circle diameter portion 102c, the machined gear is only ground in the tooth trace direction B, and not in the tooth profile direction A. As a result, the surface uniformity at the reference pitch circle diameter portion 102c becomes non-uniform. In a conventional gear grinding process, the reference pitch circle diameter portion 102c, in the relationship at the time of grinding between the threaded grinding wheel 100 and the gear 102, matches up with the reference pitch circle diameter portion when the machined gear is operated. Therefore, when the gear is operated, as the reference pitch circle diameter portion 102c with a non-uniform surface uniformity is used as a meshing surface, performance of the gear deteriorates.

After that, as illustrated in FIG. 1C, the thread ridge 100a of the threaded grinding wheel 100 moves in the direction of the arrow E, and the workpiece 102 rotates in the direction of the arrow F. As a result, the external tooth surface tooth tip portion 102d is moved relatively so as to be separated further from the tooth bottom 100d, and the reference pitch circle diameter portion 102c is moved to a position separated from the reference pitch circle diameter corresponding portion 100b.

At that time, as the thread ridge 100a moves in the direction of the arrow E and the workpiece 102 rotates in the direction of the arrow F, grinding is performed while a section that extends from the reference pitch circle diameter corresponding portion 100b to a thread ridge surface tooth tip portion 100e sequentially makes contact with a section that extends from the reference pitch circle diameter portion 102c to an external tooth surface tooth root portion 102e, so as to perform tooth surface slip (so as to move in the tooth profile direction A while slipping). Thus, the value of the rate at which tooth surface slip of the workpiece 102 is performed by the section that extends from the reference pitch circle diameter corresponding portion 100b of the threaded grinding wheel 100 to the thread ridge surface tooth tip portion 100e, with respect to the section that extends from the reference pitch circle diameter portion 102c of the gear 102 to the external tooth surface tooth root portion 102e, (the rate of movement in the tooth profile direction A) becomes greater than zero. Thus, the value of the rate at which tooth surface slip is performed by the threaded grinding wheel 100 with respect to the workpiece 102 becomes a value greater than zero. Therefore, the threaded grinding wheel 100 can grind in the tooth profile direction A of the workpiece 102 while slipping, and thereby, the surface uniformity of the tooth surface 102f of the gear 102 becomes favorable.

As described above, in the conventional gear machining process, slipping does not occur between the threaded grinding wheel and the workpiece in the tooth profile direction A at the reference pitch circle diameter portion 102c in the relationship at the time of grinding between the workpiece and the threaded grinding wheel (FIG. 1B). The present inventors have identified a problem in which, due to the above, the surface uniformity of the tooth surface at the reference pitch circle diameter portion 102c deteriorates, and as a result of this section being used as the meshing surface when the gear is operated, the performance of the gear deteriorates. In the present invention, the threaded grinding wheel is designed to be shifted so that the reference pitch circle diameter, in the relationship at the time of grinding between the workpiece and the threaded grinding wheel, becomes different from the reference pitch circle diameter when the machined gear is operated (the reference pitch circle diameter when the machined gear is meshed with another gear when the machined gear is used). As a result, the reference pitch circle diameter portion at the time of grinding, on which the surface uniformity deteriorates, can be moved outside the tooth profile evaluation range when gears are meshed in operation, and thus it is possible to prevent deterioration of the gear performance.

With reference to the attached drawings, embodiments of a gear machining apparatus according to the present invention which have solved the problem of the conventional apparatus described above will be described below.

First, with reference to FIG. 3 to FIG. 6, a basic structure of a gear machining apparatus according to a present embodiment will be described.

The reference sign 1 denotes a gear machining apparatus, and the gear machining apparatus 1 has a bed 2 that is provided at a base portion of the gear machining apparatus 1. In a description to be made below, a long-side direction of a top surface of the bed 2 is referred to as an x-axis direction, a short-side direction thereon is referred to as a y-axis direction, and a direction orthogonal to the top surface of the bed 2 is referred to as a z-axis direction. On the top surface of the bed 2, a work holding portion 6 is provided, which is used to hold a workpiece (gear) 4 (work) that is the gear to be ground.

The work holding portion 6 has a cylindrical table 8 attached to the top surface of the bed 2. The table 8 is arranged so that a center axis of the cylindrical shape thereof extends in the z-axis direction.

Furthermore, the work holding portion 6 has a cylindrical work machining rotating shaft 10 that passes through the inner circumference of the table 8. The work machining rotating shaft 10 is supported by a bearing provided in the inner circumference of the table 8 so as to be able to rotate about an axis line C1 extending in the z-axis direction.

Furthermore, the work holding portion 6 has a work rotating device 12 that is used to move the workpiece (gear) 4 between a work replacement position, at which a machined gear 4 is replaced with a non-machined workpiece 4 and the workpiece 4 is attached to the work holding portion 6, and a work machining position, at which the workpiece 4 is ground with the threaded grinding wheel.

The work rotating device 12 is provided with a rectangular column-shaped fixed portion 14 that is fixed to the top surface of the bed 2 and a rectangular column-shaped rotating portion 16 that is rotatably supported by the fixed portion 14.

A rotating portion 16 can rotate about an axis line C2 extending in the z-axis direction. A pair of tailstocks 18 are provided on the sides of the rotating portion 16. The pair of tailstocks 18 are arranged at positions axially symmetric to each other with respect to the axis line C2. Furthermore, the tailstocks 18 are supported on the sides of the rotating portion 16 so as to be able to slide in the z-axis direction.

A work arbor 20, which is used to support and rotate the workpiece (gear) 4, is attached to each of the tailstocks 18. The work arbor 20 has a round bar-shape and extends downward from a lower end of the tailstock 18 in the z-axis direction. The work arbor 20 is supported by a bearing provided in the interior of the tailstock 18 so as to be able to rotate about a rotation axis line C3 of a long-side direction of the work arbor 20.

The workpiece (gear) 4 is held in a leading end portion of the work arbor 20. In the work machining position, a rotation axis line C7 of the work arbor 20 of one of the tailstocks 18 is aligned with the axis line C1 of the work machining rotating shaft 10, and the workpiece (gear) 4 is clamped by the leading end portion of the work arbor 20 and a leading end portion of the work machining rotating shaft 10. In this way, when the work arbor 20 of one of the tailstocks 18 is in the work machining position, the work arbor 20 of the other tailstock 18 is in the work replacement position. When the work arbor 20 of one of the tailstocks 18 moves from the work machining position to the work replacement position, the work arbor 20 of the other tailstock 18 is caused to move from the work replacement position to the work machining position.

Furthermore, a grinding wheel holding portion 22, which is used to hold the grinding wheel, is provided on the top surface of the bed 2 at a position facing the work holding portion 6.

The grinding wheel holding portion 22 is provided with a rectangular column-shaped column 24 that is provided on the top surface of the bed 2 at a position facing the work holding portion 6. The column 24 is provided so as to be able to move on the top surface of the bed 2 in the x-axis direction.

Of the side surfaces of the column 24, a saddle 26 is provided on the side surface facing the work holding portion 6. The saddle 26 is provided on the side surface of the column 24 so as to be able to slide in the z-axis direction and to rotate about an axis line C4 extending in the x-axis direction.

A grinding wheel head 28, which is used to support and rotate the grinding wheel, is provided on the saddle 26.

The grinding wheel head 28 is supported on the side surface of the saddle 26 so as to be able to slide along an axis line C5 that is orthogonal to the x-axis. Furthermore, the grinding wheel head 28 is provided with a grinding wheel rotating shaft 30 that extends along the axis line C5. The grinding wheel rotating shaft 30 rotates about the axis line C5 using a driving force of a motor provided in the grinding wheel head 28. A cylindrical threaded grinding wheel 32, which has a thread ridge formed in a helical pattern on an outer peripheral surface thereof, is detachably attached to a tip of the grinding wheel rotating shaft 30. In a state in which the threaded grinding wheel 32 is attached to the grinding wheel rotating shaft 30 of the grinding wheel head 28, a rotation axis line of the threaded grinding wheel 32 is aligned with the axis line C5.

The threaded grinding wheel 32 has the thread ridge formed in a helical pattern on the outer peripheral surface thereof, and the shape of the thread ridge is a shape corresponding to desired gear parameters (desired parameters of a finished and completed machined gear, which include modules, pressure angles, the number of teeth, helix angles, and the like) of the gear (work) which is the subject workpiece. As described below, the shape of the thread ridge is a shape formed by a dresser 36 that shapes the threaded grinding wheel 32.

Figure 3:
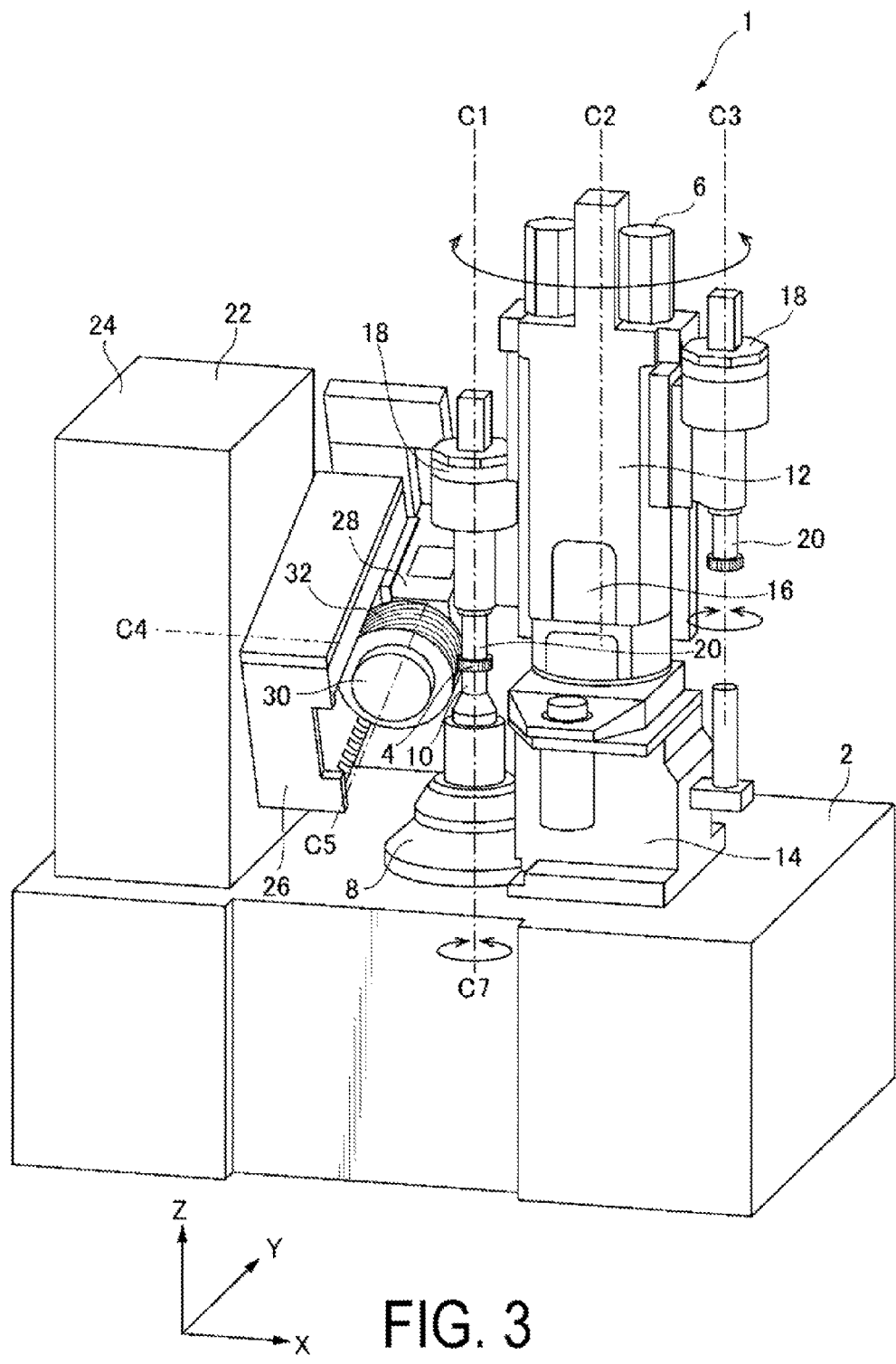
FIG. 3 is a perspective view illustrating a gear machining apparatus according to an embodiment of the present invention.
Figure 4:
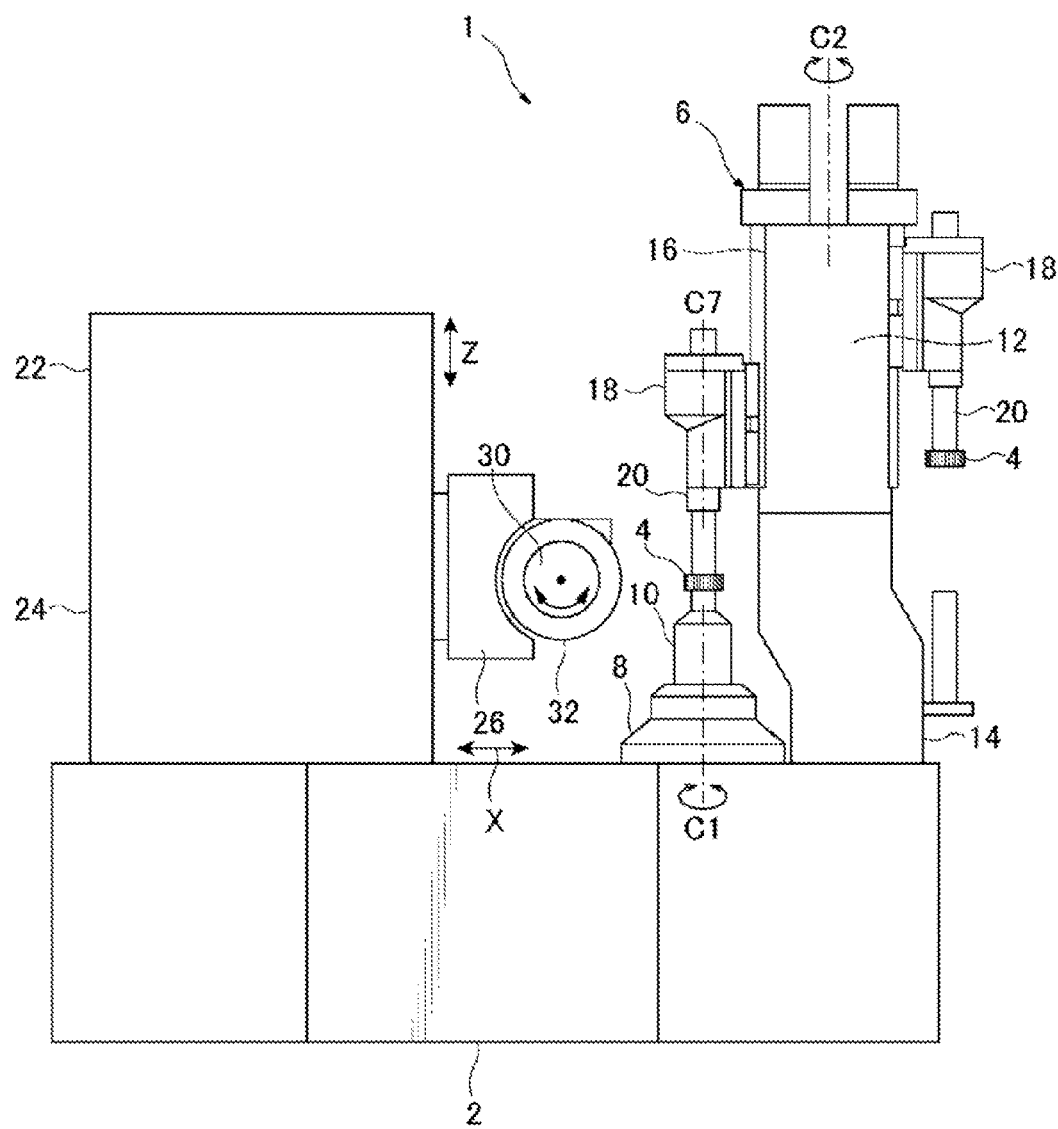
FIG. 4 is a front view illustrating the gear machining apparatus according to the embodiment of the present invention.
Figure 5:
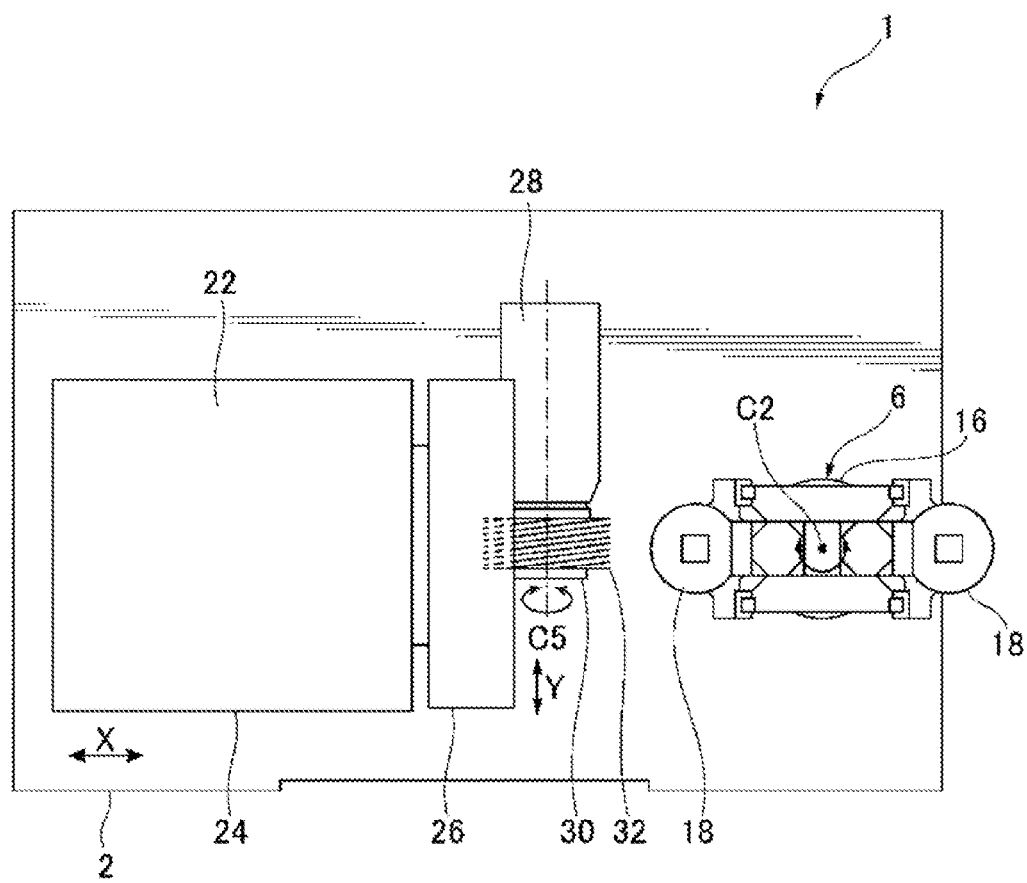
FIG. 5 is a plan view illustrating the gear machining apparatus according to the embodiment of the present invention.
Figure 6:
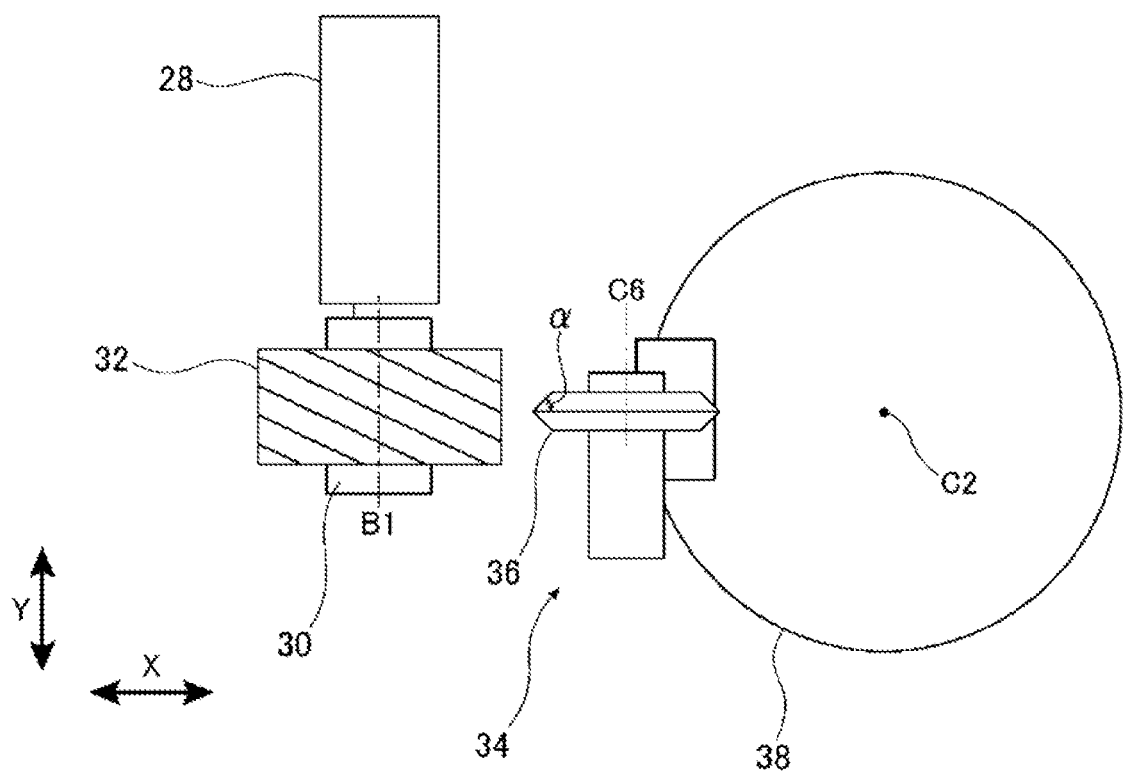
FIG. 6 is a schematic plan view illustrating a positional relationship between a threaded grinding wheel and a dresser device of the gear machining apparatus of the present invention.

Furthermore, as illustrated in FIG. 6, the gear machining apparatus 1 is provided with a dresser device 34 that is provided on the bed 2 and that shapes the threaded grinding wheel 32 (the dresser device 34 is omitted in FIG. 3 to FIG. 5). Positional relationships between the dresser device 34 and the threaded grinding wheel 32, the axis line C2 of the rotating portion 16 of the work rotating device 12, and the like are illustrated in FIG. 6. The dresser device 34 is a rotary dressing device that shapes the threaded grinding wheel 32. The dresser device 34 is provided with the dresser 36, to which a diamond is attached so as to be able to shape the threaded grinding wheel 32 and which is formed in a disc-shape, and a dresser holding portion 38 that can drive the dresser 36 to rotate and hold the dresser 36. Here, the shaping operation includes treeing operations and dressing operations of the threaded grinding wheel 32 by the dresser 36.

The dresser holding portion 38 is provided on the bed 2 and can rotate about the axis line C2 of the rotating portion 16 of the work rotating device 12. The dresser holding portion 38 can cause the dresser 36 to move to a position facing the threaded grinding wheel 32 and to be arranged at a position at which the threaded grinding wheel 32 is shaped. The dresser holding portion 38 can support the dresser 36 while rotating the dresser 36 about a rotation axis line C6.

The dresser 36 shapes the threaded grinding wheel 32 in accordance with its own shape, and the shape of the workpiece 4 is ground in accordance with the shape of the threaded grinding wheel 32. Thus, the shape of the dresser 36 corresponds to the shape of the gear 4. For example, the dresser 36 has a type of relationship in which, when a pressure angle $\alpha$ of the dresser 36 is determined, a pressure angle of the threaded grinding wheel 32, which is shaped by the dresser 36, is also determined. In this way, when gear parameters of the dresser 36, such as the pressure angle $\alpha$, and the like, are determined, the dresser 36 can indirectly determine gear parameters of the gear 4, such as the pressure angle, and the like, via gear parameters of the threaded grinding wheel 32, such as the pressure angle and the like. Specifically, the gear parameters of the dresser 36 are designed in accordance with a desired tooth profile of the gear 4.

In this way, when the parameters of the dresser 36 are designed to be shifted, the reference pitch circle diameter PCD, in the relationship between the threaded grinding wheel 32 and the gear 4 to be machined, may be moved by this via the threaded grinding wheel 32. Specifically, as a result of the dresser 36 being designed to be shifted, the position at which relative movement in the tooth profile direction does not occur between a surface of the threaded grinding wheel 32 and the gear 4 to be machined may be moved. Parameters of the dresser 36 being designed to be shifted means that the parameters of the dresser 36 (such as the pressure angle $\alpha$) are designed to be different from the values of pressure angle and the like when the gear to be machined is operated.

When the parameters of the dresser 36 are designed to be shifted, the position, at which relative movement in the tooth profile direction of gear 4 does not occur between the surface of the threaded grinding wheel 32 and the gear 4 to be machined, becomes different from the position obtained under a normal design. However, the shift design does not change the tooth profile of the gear 4 (for example, sizes of a tip diameter and a base circle diameter of the gear 4).

Note that the theory of the "shift design" of the gear used in the present invention means that parameters of the threaded grinding wheel are designed so as to change the tooth cutting pitch circle diameter of the gear (the reference pitch circle diameter in the relationship between the threaded grinding wheel and the gear to be machined), for example. More specifically, the "shift design" means that the parameters of the threaded grinding wheel such as pressure angle are designed so as to be different from that of a standard design based on the desired tooth profile of the gear. At that time, a machined gear of the standard design and a machined gear of the shift design can be meshed together correctly.

Furthermore, the gear machining apparatus 1 has a controller (not illustrated) that controls the work holding portion 6, the grinding wheel holding portion 22, and the dresser device 34. The controller (not illustrated) is electrically connected to the work machining rotating shaft 10, the work rotating device 12, the tailstocks 18, the column 24, the saddle 26, the grinding wheel head 28, the dresser holding portion 38, and the like, and controls shaping of the threaded grinding wheel 32 with the dresser 36 and grinding of the workpiece 4 with the threaded grinding wheel 32.

Next, with reference to FIG. 6 and FIG. 7, operations (effects) of a gear machining apparatus, which is used to grind the workpiece, according to a first embodiment of the present invention will be described.

Figure 7:
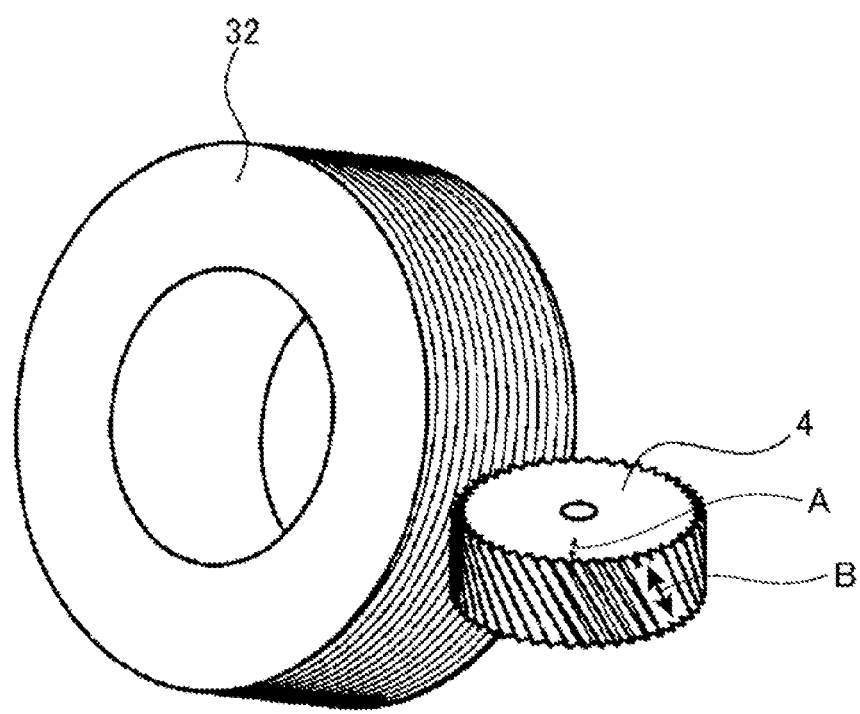
FIG. 7 is a schematic perspective view illustrating a state in which the threaded grinding wheel of the gear machining apparatus according to the embodiment of the present invention grinds the workpiece.

FIG. 7 is a schematic perspective view illustrating a state in which the threaded grinding wheel of the gear machining apparatus according to the first embodiment of the present invention grinds the workpiece.

First, the operation of shaping the threaded grinding wheel 32 with the dresser 36 will be described. As illustrated in FIG. 6, the dresser 36 is moved by the dresser holding portion 38 to a position facing the threaded grinding wheel 32, and the dresser 36 is readied at a position at which the dresser 36 shapes the threaded grinding wheel 32.

Next, after rotating the dresser 36 about the rotation axis line C6 of the dresser, the threaded grinding wheel 32 to be shaped is caused to be meshed with the rotating dresser 36.

In a state in which the dresser 36 and the threaded grinding wheel 32 to be shaped are meshed with each other, the threaded grinding wheel 32 to be shaped is rotated about the axis line C5 of the grinding wheel rotating shaft and is moved in an axial direction of the grinding wheel rotation axis C5. In this manner, while the threaded grinding wheel 32 is being moved, the threaded grinding wheel 32 is shaped into a shape that enables the threaded grinding wheel 32 to grind the gear 4 corresponding to the design parameters of the dresser 36.

The pressure angle α of the dresser 36 is reflected in the pressure angle of the threaded grinding wheel 32. Therefore, the pressure angle α of the dresser 36, which is designed to be shifted, is reflected in the pressure angle of the threaded grinding wheel 32, and thus, it is possible to form the threaded grinding wheel 32 so that the position, at which relative movement in the tooth profile direction does not occur between the surface of the threaded grinding wheel 32 and the gear 4 to be machined, is positioned outside of the tooth profile evaluation range of a tooth surface 5 (FIG. 2).

Here, the tooth profile evaluation range of the gear 4 is a range in which the tooth profile of the gear 4 is evaluated, and more specifically, a range in which the tooth profile is evaluated to determine whether the gear 4 satisfies design requirement criteria required for the gear 4 to function as a gear (the tooth profile evaluation range on the tooth surface 5 of the gear 4 is illustrated in FIG. 2 as an example). Of such a tooth surface of the gear, a range in which the tooth profile should be evaluated is a section which functions as a tooth surface of a gear, namely, a section which is meshed with another gear and transmits force at the time at which the gear is operated. The tooth profile evaluation range is set within a range between an outer diameter portion L2 of the gear 4 (see FIG. 8) and a tooth profile evaluation range lower limit diameter L1 (see FIG. 8) arranged inwards from the outer diameter portion L2 by a constant distance in accordance with the parameters required for the gear 4. In the conventional gear machining process, the position, at which relative movement in the tooth profile direction does not occur between the surface of the threaded grinding wheel and the gear to be machined, is the same as the position of the pitch circle diameter of the machined gear when operated, and is positioned within the tooth profile evaluation range of the gear.

Next, the operation of grinding the workpiece 4 with the threaded grinding wheel 32 will be described.

In FIG. 2 and FIG. 7, the tooth profile direction of the gear 4 is denoted by a reference sign A, and the tooth trace direction of the gear 4 is denoted by a reference sign B.

As illustrated in FIG. 4, the workpiece 4 is arranged in the work machining position.

Next, in a state in which the threaded grinding wheel 32 is rotated about the grinding wheel rotation axis C5 and the workpiece 4 is rotated about the workpiece rotation axis line C7, the threaded grinding wheel 32 is meshed with the workpiece 4, as illustrated in FIG. 7. As a result of the threaded grinding wheel 32 and the workpiece 4 being rotated in a meshed state, the threaded grinding wheel 32 grinds so as to form each gear of the workpiece 4.

Here, the threaded grinding wheel 32, which is formed by the dresser 36 designed to be shifted, can grind the workpiece 4 based on its own shape so as to form the above-described position, at which relative movement in the tooth profile direction does not occur, outside of the tooth profile evaluation range, in which the tooth profile of the gear 4 is evaluated.

As described above, when the threaded grinding wheel 32 grinds the workpiece 4, tooth surface slip occurs in which the threaded grinding wheel 32 and the workpiece 4 move relatively to each other so as to slide (shift) in the tooth profile direction of the workpiece 4. This tooth surface slip occurs in a section outside the pitch circle diameter portion in the relationship between the threaded grinding wheel 32 and the workpiece 4. More specifically, the value of the tooth surface slip rate becomes zero in the above-described pitch circle diameter portion, and the value becomes greater than zero at a position outside of the above-described pitch circle diameter portion. Therefore, in the first embodiment of the present invention, as the pitch circle diameter portion in the relationship between the threaded grinding wheel 32 and the workpiece 4, namely, the position at which relative movement in the tooth profile direction does not occur is arranged outside of the tooth profile evaluation range of the tooth surface 5, the threaded grinding wheel 32 grinds with respect to the workpiece 4, within the tooth profile evaluation range of the gear 4, so as to cause the value of the tooth surface slip rate to become greater than zero and also to cause the above-described position, at which relative movement in the tooth profile direction does not occur, to be positioned outside of the tooth profile evaluation range.

As a result of tooth surface slip occurring within the tooth profile evaluation range of the gear 4, grinding is performed while the threaded grinding wheel 32 and the workpiece 4 are respectively sliding. Thus, the threaded grinding wheel 32 can achieve a favorable state in which the surface uniformity in the tooth profile direction is substantially even. Furthermore, as tooth surface slip does not occur at the above-described position at which relative movement in the tooth profile direction does not occur, the shape of the threaded grinding wheel 32 (dresser 36) is transferred as it is, and as a result, the surface uniformity in the tooth profile direction is not kept substantially even, and becomes rough rapidly and deteriorates. However, as this position is outside of the tooth profile evaluation range of the gear 4, there is no impact on the performance of the gear.

Next, a description will be made of the fact that, in the first embodiment of the present invention, by forming the dresser designed to obtain the intended gear 4 as the dresser 36 that is designed to be shifted so that the pressure angle α of the dresser is decreased, it is possible to cause the value of the tooth surface slip rate to become greater than zero in the tooth profile evaluation range of the gear 4.

Figure 8:
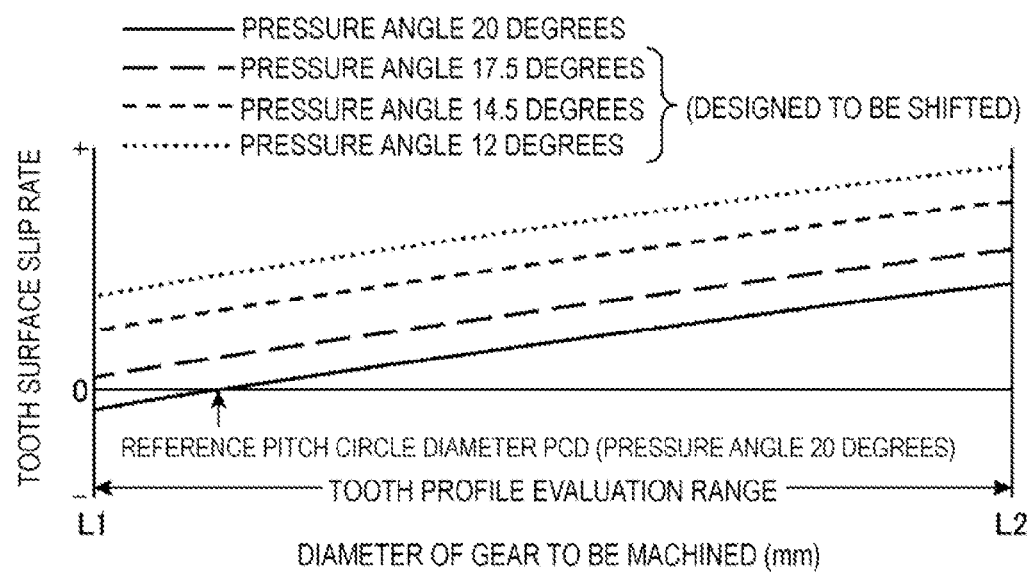
FIG. 8 is a line chart comparatively showing tooth surface slip rates, in the tooth profile evaluation range, of respective tooth surfaces of a gear shaped by a first embodiment of the present invention and a gear shaped by a conventional apparatus.

FIG. 8 is a line chart comparatively showing the tooth surface slip rates, in the tooth profile evaluation range, of respective tooth surfaces of a gear shaped by the first embodiment of the present invention and a gear shaped by the conventional apparatus.

In FIG. 8, the horizontal axis indicates a diameter [mm] of the gear to be machined in the gear 4, and the vertical axis indicates the value of the tooth surface slip rate using plus and minus values, with the reference value at 0. The tooth profile evaluation range is a range between the tooth profile evaluation range lower limit diameter L1 and the outer diameter portion L2 with respect to the diameter of the gear to be machined.

As illustrated in FIG. 8, in the conventional apparatus, when the dresser, which is designed to obtain an originally intended gear to be machined, has the pressure angle α of the dresser set at 20 degrees, the value of the rate of tooth surface slip, which is performed by the threaded grinding wheel shaped by the dresser with respect to the workpiece 4, becomes zero at the position of the reference pitch circle diameter PCD at the time of grinding, within the tooth profile evaluation range of the diameter of the gear to be machined.

When the dresser 36 is used which is formed by the shift design so that the 20 degrees pressure angle of the dresser is decreased to the pressure angle α of 17.5 degrees, 14.5 degrees, 12 degrees, or the like, the value of the rate of tooth surface slip, which is performed by the threaded grinding wheel 32 shaped by the dresser 36 with respect to the workpiece 4, becomes greater than zero at the tooth profile evaluation range lower limit diameter L1 of the tooth profile evaluation range. Specifically, as a result of changing the pressure angle of the dresser 36 to the decreased pressure angle α by the shift design, the position, at which relative movement in the tooth profile direction of the gear 4 does not occur between the surface of the threaded grinding wheel 32 and the gear 4 to be machined, is moved so as to be arranged at a position of a diameter which is even smaller than the tooth profile evaluation range lower limit diameter L1 of the tooth profile evaluation range, and the value of the tooth surface slip rate becomes greater than zero in the tooth profile evaluation range. Therefore, the threaded grinding wheel 32 can grind the workpiece 4 while moving in the tooth profile direction of the gear 4 to be machined, and can improve the surface uniformity in the tooth profile evaluation range of the gear 4.

Comparisons between measurement results of the surface uniformity in the tooth profile evaluation range of the gear 4 obtained using the shift-designed dresser 36 of the gear machining apparatus 1 according to the first embodiment of the present invention and, as a comparative example, measurement results of the surface uniformity in the tooth profile evaluation range of the gear obtained using the dresser before being designed to be shifted so as to form the dresser 36 of the gear machining apparatus 1 according to the first embodiment of the present invention will be shown.

Figure 9:
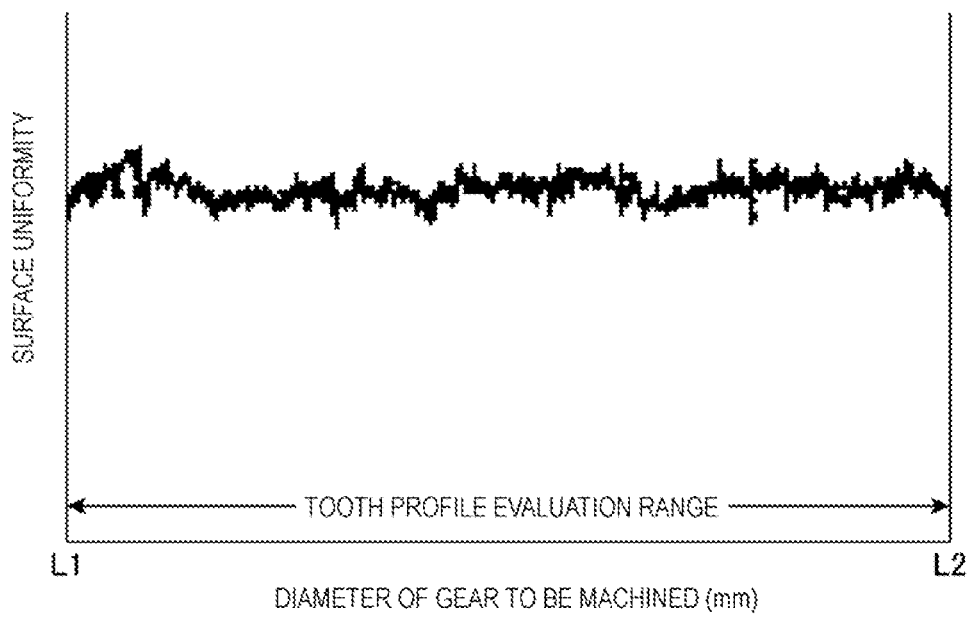
FIG. 9 is a line chart showing the surface uniformity, in the tooth profile evaluation range, of the tooth surface of the gear shaped by the gear machining apparatus according to the first embodiment of the present invention.
Figure 10:
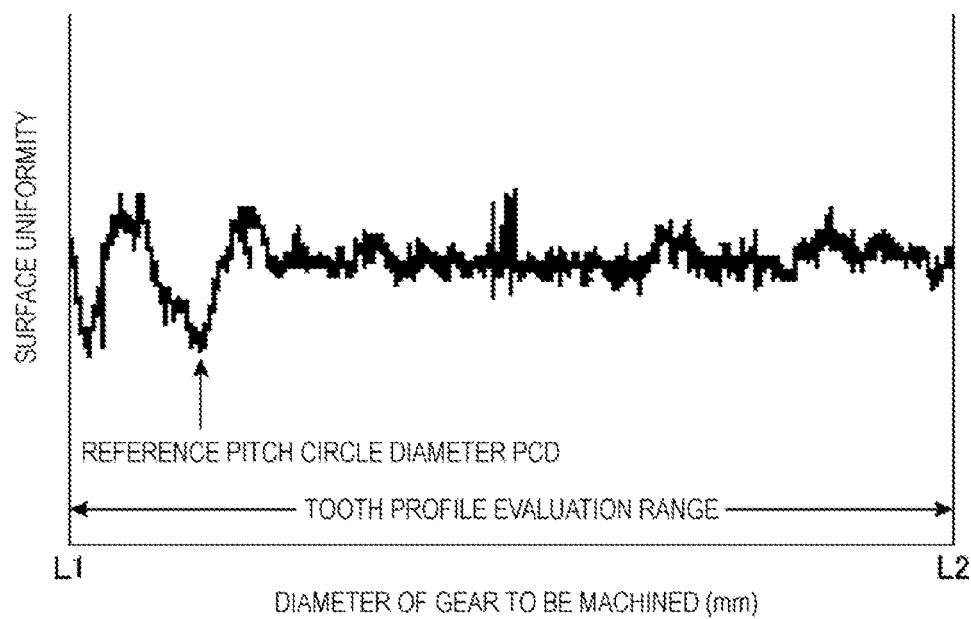
FIG. 10 is a line chart showing the surface uniformity, in the tooth profile evaluation range, of the tooth surface of the gear shaped by the conventional apparatus.

FIG. 9 is a line chart showing the surface uniformity, in the tooth profile evaluation range, of the tooth surface of the gear shaped by the gear machining apparatus according to the first embodiment of the present invention, and FIG. 10 is a line chart showing the surface uniformity, in the tooth profile evaluation range, of the tooth surface of the gear shaped by the conventional apparatus.

In both FIG. 9 and FIG. 10, the horizontal axis indicates the tooth profile evaluation range of the diameter of the gear to be machined in the gear 4, and the vertical axis indicates the surface uniformity. The surface uniformity is measured by an arithmetic average roughness (Ra), a maximum height (Rz), and the like.

In FIG. 9, in a case when the threaded grinding wheel 32 is shaped using the shift-designed dresser 36 and the threaded grinding wheel 32 grinds the workpiece 4, a state is described in which the above-described position, at which relative movement in the tooth profile direction of the gear 4 does not occur, is moved outside of the tooth profile evaluation range to an inner side of the tooth profile evaluation range in a radial direction. Therefore, a state is described in which the above-described position, at which relative movement in the tooth profile direction of the gear 4 does not occur, does not exist in the tooth profile evaluation range of the gear 4. Thus, it is possible to eliminate a position, at which the value of the tooth surface slip rate becomes zero, within the tooth profile evaluation range of the gear diameter of the gear 4, and as the value of the tooth surface slip rate becomes greater than zero, the threaded grinding wheel 32 can perform grinding with respect to the workpiece 4 while moving in the tooth profile direction of the workpiece 4. Furthermore, the surface uniformity within the tooth profile evaluation range can be made to be a substantially constant value similar to that of the surface uniformity around the outer diameter portion L2 of the gear 4 (can be made relatively even), and it is evident that the surface uniformity is improved.

Meanwhile, in FIG. 10, as a series of machining is performed using the conventional apparatus, which is provided with the dresser before being designed to be shifted so as to form the dresser 36 of the gear machining apparatus 1 according to the first embodiment of the present invention, there exists a position, at which relative movement in the tooth profile direction of the gear 4 does not occur, within the tooth profile evaluation range of the gear, and it can be understood that, in the vicinity of this position, the surface uniformity is not even and changes rapidly, and there is a section in which the surface uniformity deteriorates.

With the above-described gear machining apparatus 1 according to the first embodiment of the present invention, the threaded grinding wheel 32 is shaped by the dresser 36, and the workpiece 4 is machined by the threaded grinding wheel 32 so as to be shaped into the gear 4. When the shaped threaded grinding wheel 32 shapes the workpiece 4, the pressure angle α of the dresser 36 is designed to be shifted so that the position, at which relative movement in the tooth profile direction A of the workpiece 4 does not occur between the surface of the threaded grinding wheel 32 and the workpiece 4 to be machined, is positioned outside of the tooth profile evaluation range. As a result, within the tooth profile evaluation range of the tooth surface 5 of the machined gear 4, the position does not exist at which relative movement in the tooth profile direction A of the workpiece 4 does not occur between the surface of the threaded grinding wheel 32 and the workpiece 4 to be machined. Thus, the tooth surface slip rate, at which the threaded grinding wheel 32 moves with respect to the workpiece 4 in the tooth profile direction A of the workpiece 4, does not become zero, and it is possible to improve the surface uniformity in the tooth profile evaluation range of the tooth surface 5 of the gear 4.

Furthermore, with the gear machining apparatus 1 according to the first embodiment of the present invention, the dresser 36 is designed to be shifted so that the pressure angle α thereof is decreased, and the position, at which relative movement in the tooth profile direction A of the workpiece 4 does not occur between the surface of the threaded grinding wheel 32 and the workpiece 4 to be machined, is moved to the inner side of the tooth profile evaluation range of the tooth surface 5. Thus, the above-described position, at which relative movement does not occur, does not exist within the tooth profile evaluation range of the tooth surface 5 of the gear 4. As a result, the tooth surface slip rate, at which the threaded grinding wheel 32 moves with respect to the workpiece 4 in the tooth profile direction A of the workpiece 4, does not become zero, and it is possible to improve the surface uniformity in the tooth profile evaluation range of the tooth surface 5 of the gear 4.

Furthermore, with a gear machining method according to the first embodiment of the present invention, the threaded grinding wheel 32 is shaped by the dresser 36, and the workpiece 4 is machined by the threaded grinding wheel 32 and shaped into the gear 4. When the shaped threaded grinding wheel 32 shapes the workpiece 4, the pressure angle α of the dresser 36 is designed to be shifted so that the position, at which relative movement in the tooth profile direction of the workpiece 4 does not occur between the surface of the threaded grinding wheel 32 and the workpiece 4 to be machined, is positioned outside of the tooth profile evaluation range of the tooth surface 5. As a result, within the tooth profile evaluation range of the tooth surface 5 of the machined gear 4, the position does not exist at which relative movement in the tooth profile direction A of the workpiece 4 does not occur between the surface of the threaded grinding wheel 32 and the workpiece 4 to be machined. Thus, the tooth surface slip rate, at which the threaded grinding wheel 32 moves with respect to the workpiece 4 in the tooth profile direction A of the workpiece 4, does not become zero, and it is possible to improve the surface uniformity in the tooth profile evaluation range of the tooth surface 5 of the gear 4.

Next, with reference to FIG. 11, a gear machining apparatus according to a second embodiment of the present invention will be described. The gear machining apparatus of the present embodiment is different from the gear machining apparatus according to the first embodiment described above in that the dresser is designed to be shifted so that the pressure angle thereof is increased, and a position, at which relative movement in the tooth profile direction of the gear 40 does not occur between the surface of the threaded grinding wheel 32 and a gear 40 to be machined, is moved so as to be larger than the tooth profile evaluation range.

Here, only aspects of the second embodiment of the present invention that are different from those of the first embodiment will be described. The same reference signs are assigned to similar portions in the drawings, and descriptions thereof will be omitted.

A description will be made of the fact that, in the second embodiment of the present invention, by forming the dresser designed to obtain an intended gear 40 as a dresser 42 that is designed to be shifted so that the pressure angle of the dresser is increased, it is possible to cause the value of the tooth surface slip rate to be smaller than zero in the tooth profile evaluation range of the gear 40.

Figure 11:
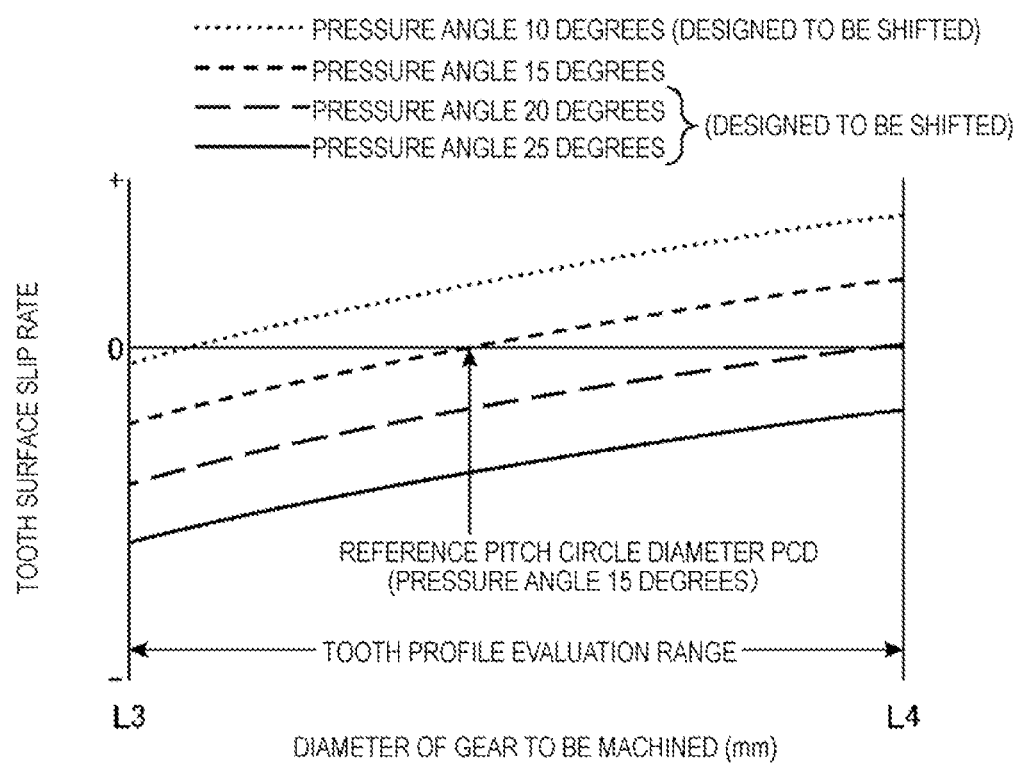
FIG. 11 is a line chart comparatively showing tooth surface slip rates, in the tooth profile evaluation range, of respective tooth surfaces of a gear shaped by a second embodiment of the present invention and the gear shaped by the conventional apparatus.

FIG. 11 is a line chart comparatively showing tooth surface slip rates, in the tooth profile evaluation range, of respective tooth surfaces of a gear shaped by the second embodiment of the present invention and the gear shaped by the conventional apparatus.

In FIG. 11, the horizontal axis indicates a diameter [mm] of the gear to be machined in the gear 4, and the vertical axis indicates the value of the tooth surface slip rate using plus and minus values, with the reference value at 0.

The tooth profile evaluation range is a range between a tooth profile evaluation range lower limit diameter L3 of the tooth surface and an outer diameter L4 in the diameter of the gear to be machined.

As illustrated in FIG. 11, in the conventional apparatus, when the dresser, which is designed to obtain the originally intended gear 40, has the pressure angle of the dresser set at 15 degrees, the value of the rate of tooth surface slip, which is performed by a threaded grinding wheel shaped by the dresser with respect to the workpiece, becomes zero at the position of the reference pitch circle diameter PCD, at the time of grinding, within the tooth profile evaluation range of the diameter of the gear to be machined.

When the dresser is changed so as to form the dresser 42 in which the pressure angle of 15 degrees is increased to the pressure angle α of 25 degrees by the shift design, the value of the rate of tooth surface slip, which is performed by a threaded grinding wheel 44 shaped by the shift-designed dresser 42 with respect to the workpiece 40, becomes smaller than zero at the outer diameter L4 of the tooth profile evaluation range of a tooth surface 45. More specifically, when the shift-designed dresser 42 is used to shape the threaded grinding wheel 44 and the threaded grinding wheel 44 grinds the workpiece 40, the position, at which relative movement in the tooth profile direction of the gear 40 does not occur between the surface of the threaded grinding wheel 32 and the gear 40 to be machined, is moved so as to be arranged at a position of a diameter which is even larger than the outer diameter L4, namely, the upper limit of the tooth profile evaluation range of the tooth surface 45, and the value of the tooth surface slip rate becomes greater than zero within the tooth profile evaluation range (the value of the tooth surface slip rate becomes a minus value). Thus, the threaded grinding wheel 44 can grind the workpiece 40 while moving in the tooth profile direction of the workpiece 40, and it is possible to improve the surface uniformity in the tooth profile evaluation range of the tooth surface 45 of the gear 4.

With respect to the dresser 42, even when an originally designed dresser has a different pressure angle, by changing the pressure angle of the originally designed dresser to the increased pressure angle α by the shift design with respect to the dresser 42 in the same manner, it is possible to move the position, at which the above-described relative movement in the tooth profile direction of the gear 40 does not occur, to be arranged at the position of the diameter which is larger than the outer diameter L4 of the tooth profile evaluation range and to cause the value of the tooth surface slip rate to become greater than zero in the tooth profile evaluation range. Thus, the threaded grinding wheel 44 can perform grinding with respect to the workpiece 40 while moving in the tooth profile direction of the workpiece 40, and it is possible to improve the surface uniformity in the tooth profile evaluation range of the gear 4.

With the gear machining apparatus according to the second embodiment of the present invention, the dresser 42 is designed to be shifted so that the pressure angle α thereof is increased, and the position, at which relative movement in the tooth profile direction of the gear 40 does not occur between the surface of the threaded grinding wheel 32 and the gear 40 to be machined, is moved to an outer side of the tooth profile evaluation range of the tooth surface 45. Thus, the above-described position, at which relative movement does not occur, does not exist within the tooth profile evaluation range of the tooth surface 45 of the gear 40. As a result, the tooth surface slip rate, at which the threaded grinding wheel 44 moves with respect to the workpiece 40 in the tooth profile direction A of the workpiece 40, does not become zero, and thus, it is possible to improve the surface uniformity in the tooth profile evaluation range of the tooth surface 45 of the gear 40.

REFERENCE SIGNS LIST

1 Gear machining apparatus
4 Workpiece (gear)
32 Threaded grinding wheel
36 Dresser
40 Gear to be machined
42 Dresser
44 Threaded grinding wheel
A Tooth profile direction
B Tooth trace direction
L1 Tooth profile evaluation range lower limit diameter
L2 Outer diameter portion
L3 Tooth profile evaluation range lower limit diameter
L4 Outer diameter
PCD Reference pitch circle diameter

The invention claimed is:
1. A gear machining apparatus configured to shape a gear by machining a workpiece with a grinding wheel, the gear machining apparatus comprising:

a threaded grinding wheel configured to shape a gear by machining a workpiece; and a disc-shaped dresser configured to shape the threaded grinding wheel while rotating with the threaded grinding wheel in a meshed state, a pressure angle of the dresser being designed to be shifted so that a position, at which relative movement in a tooth profile direction of the gear does not occur between a surface of the threaded grinding wheel and a gear to be machined, is positioned outside of a tooth profile evaluation range, when the shaped threaded grinding wheel shapes the gear, and the tooth profile evaluation range being set as a section of a tooth surface of the machined gear that functions as a tooth surface of the gear when the gear is used.

2. The gear machining apparatus according to claim 1, wherein the dresser is designed to be shifted so that a pressure angle thereof is decreased, and the position at which relative movement does not occur is moved to an inner side of the tooth profile evaluation range.

3. The gear machining apparatus according to claim 1, wherein the dresser is designed to be shifted so that a pressure angle thereof is increased, and the position at which relative movement does not occur is moved to an outer side of the tooth profile evaluation range.

4. A gear machining method for shaping a gear by machining a workpiece with a grinding wheel, the gear machining method comprising the steps of:

preparing a threaded grinding wheel configured to shape a gear by machining a workpiece and a disc-shaped dresser configured to shape the threaded grinding wheel while rotating with the threaded grinding wheel in a meshed state;

shaping the threaded grinding wheel with the dresser; and shaping the gear by machining the workpiece with the threaded grinding wheel, a pressure angle of the dresser being designed to be shifted so that a position, at which relative movement in a tooth profile direction of the gear does not occur between a surface of the threaded grinding wheel and a gear to be machined, is positioned outside of a tooth profile evaluation range, when the shaped threaded grinding wheel shapes the gear, and the tooth profile evaluation range being set as a section of a tooth surface of the machined gear that functions as a tooth surface of the gear when the gear is used.

* * * * *